United States Patent
Notohara et al.

(12)

(10) Patent No.: US 6,198,240 B1
(45) Date of Patent: *Mar. 6, 2001

(54) MOTOR CONTROLLER

(75) Inventors: Yasuo Notohara, Hitachiohta; Yukio Kawabata; Kazuo Tahara, both of Hitachi; Makoto Ishii, Utsunomiya; Yuhachi Takakura, Oyama, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,876

(22) PCT Filed: Oct. 6, 1995

(86) PCT No.: PCT/JP95/02056

§ 371 Date: Apr. 2, 1998

§ 102(e) Date: Apr. 2, 1998

(87) PCT Pub. No.: WO97/13318

PCT Pub. Date: Apr. 10, 1997

(51) Int. Cl.[7] .................................................. H02P 5/41
(52) U.S. Cl. ........................ 318/268; 318/438; 318/722
(58) Field of Search ................................ 318/138, 254, 318/438, 459, 500, 720, 721, 722, 723, 724, 268; 363/34, 37

(56) References Cited

U.S. PATENT DOCUMENTS

| | | | |
|---|---|---|---|
| 3,581,175 | * 5/1971 | Merz | 318/500 X |
| 3,584,279 | * 6/1971 | Krauthamer et al. | 318/808 |
| 4,329,630 | * 5/1982 | Park | 318/258 |
| 4,364,237 | 12/1982 | Cooper et al. | |
| 4,451,112 | * 5/1984 | Hattori et al. | 318/778 |
| 4,640,389 | * 2/1987 | Kamaike | 187/296 |
| 4,763,600 | * 8/1988 | D'Atre et al | 318/759 |
| 4,810,948 | 3/1989 | Takuma . | |

(List continued on next page.)

FOREIGN PATENT DOCUMENTS

| | | |
|---|---|---|
| 36 13 918 A1 | 10/1986 | (DE) . |
| 7-250493 | 9/1995 | (JP) . |

*Primary Examiner*—Bentsu Ro
(74) *Attorney, Agent, or Firm*—Antonelli, Terry, Stout & Kraus, LLP

(57) ABSTRACT

A motor controller is made up of a power supply circuit rectifying an AC power supply for outputting desired DC voltages while, at the same time, improving the power factor of the AC power supply, and a motor drive circuit for driving a motor. The controller has a rectifier circuit for converting AC power to a DC voltage and a smoothing circuit, a converter circuit constituted of a chopper circuit for controlling the DC voltage by utilizing a switching operation and the energy storing effect of an inductance, a motor drive device made up of an inverter circuit connected to the output of the converter circuit to control a motor, a converter control circuit for controlling the switching operation of the chopper circuit, an inverter control circuit for controlling the switching operation of the inverter circuit thereby driving the motor, a speed detector circuit for detecting a position of the rotor of the motor for calculating the speed of the motor, a speed control circuit receiving the calculated speed value and a speed command value for controlling the motor speed through the inverter circuit, and a DC voltage control circuit receiving the output signal of the speed control circuit for controlling the DC voltage through the converter control circuit in accordance with the output signal. The DC voltage control circuit, when the output of the speed control circuit reaches a predetermined value, outputs a signal to cause the DC voltage to increase or decrease to the converter control circuit. The output of the speed control circuit is a duty ratio signal or a speed deviation signal representing a deviation of the calculated speed value from the speed command value.

15 Claims, 14 Drawing Sheets

U.S. PATENT DOCUMENTS

| | | |
|---|---|---|
| 4,855,652 | 8/1989 | Yamashita et al . |
| 4,926,009 * | 5/1990 | Ricker et al ......................... 318/254 |
| 5,237,494 * | 8/1993 | Baader et al. ....................... 363/141 |
| 5,255,530 | 10/1993 | Janke . |
| 5,257,508 | 11/1993 | Powell et al . |
| 5,262,704 * | 11/1993 | Farr ..................................... 318/434 |
| 5,270,623 * | 12/1993 | Ohta et al ............................ 318/268 |
| 5,347,211 | 9/1994 | Jakubowski . |
| 5,447,414 * | 9/1995 | Nordby et al .......................... 417/20 |
| 5,510,688 * | 4/1996 | Schwarz ............................... 318/801 |
| 5,585,708 * | 12/1996 | Richardson et al. ................. 318/800 |
| 5,811,953 * | 9/1998 | Watanabe et al .................... 318/268 |

\* cited by examiner

MOTOR CONTROLLER

BACKGROUND OF THE INVENTION

The present invention relates to a motor controller made up of a power supply circuit for rectifying an AC power source to output desired DC voltages while, at the same time, improving the power factor of the AC power source, and to a motor drive circuit for driving a motor.

A motor controller operating as a rectifying circuit for rectifying an AC power source to provide a DC power supply and for performing speed control of a motor by using, in combination, a power supply circuit, which is capable of suppressing harmonics occurring in the power source current, and a motor driving circuit is disclosed in Japanese Laid-open Patent No. Hei 6-105563 is known.

The motor controller is formed of a power factor improving converter circuit employing a step-up chopper circuit, which simultaneously performs suppression of harmonics in the power source current and control of the DC voltage, and an inverter circuit for driving the motor. The motor controller, at the time of low load operation, controls the DC voltage to take on the lowest voltage value which will allow the power factor to be improved and performs speed control of the motor through PWM control by the inverter circuit and, at the time of high load operation, stops the PWM control performed by the inverter and performs speed control of the motor through DC voltage control by the converter circuit, i.e., PAM control.

In the above described motor controller, the configuration of the motor speed control circuit at the time of low load operation and that at the time of high load operation is different, and so different speed controlling operations are necessary according to the conditions of the load. Namely, at the time of low load operation, the duty ratio of the PWM signal for the inverter is calculated from the speed deviation and, at the time of high load operation, the DC voltage command for the converter is calculated from the speed deviation.

Further, switching between the control circuit at the time of low load operation and the control circuit at the time of high load operation is carried out in accordance with the DC voltage value of the duty ratio of the PWM signal for the inverter, the speed command value and the present speed.

Thus, in the above described motor controller, it is required to have two kinds of speed control circuits, one for low load operation and another for high load operation, and hence, the control circuit becomes complex.

Further, since the determination of switching of the condition for the control circuits between the low load operation and high load operation is based on a number of different signals, many detector circuits are required.

An object of the invention is to solve the above described problems inherent in the known motor controller and to provide a motor controller capable of executing motor speed control by the use of one simple speed control circuit, whether the load is high or low.

SUMMARY OF THE INVENTION

The present invention relates to a motor controller comprising a rectifier circuit for converting AC power to DC power and a smoothing circuit, a converter circuit constituted of a chopper circuit for controlling the DC voltage by utilizing switching operation and the energy storing effect of an inductance, a motor drive device made up of an inverter circuit connected between the output of the converter circuit and a motor, a converter control circuit for controlling the switching operation of the chopper circuit, an inverter control circuit for controlling the switching operation of the inverter circuit for driving the motor, a speed detector circuit for detecting the position of the rotor of the motor for calculating the speed of the motor, a speed control circuit responsive to a calculated speed value and a speed command value for performing speed control of the motor through the inverter control circuit, and a DC voltage control circuit responsive to the output signal of the speed control circuit for controlling the DC voltage through the converter control circuit.

As a preferred embodiment, the DC voltage control circuit is adapted to output to the converter control circuit a signal causing the DC voltage to increase or decrease when the output of the speed control circuit reaches a predetermined value.

As a preferred embodiment, the DC voltage control circuit is adapted to control the DC voltage through the converter control circuit such that the output of the speed control circuit takes on a predetermined value.

As a preferred embodiment, a duty ratio signal or a speed deviation signal representing a deviation of the calculated speed value from the speed command value is provided as the output of the speed control circuit.

As a preferred embodiment, the motor controller further comprises a DC voltage pulsation correcting circuit for detecting pulsating components of the DC voltage for changing the input signal to the inverter control circuit in accordance with the pulsating components.

In the above described structure, the inverter control circuit drives the switching device of the inverter to drive the motor in accordance with a position signal received from the speed detector circuit and the duty ratio signal received from the speed control circuit. The speed detector circuit detects an induced voltage by the motor and calculates the position of the rotor from the induced voltage to output the detected position signal in a pulse form and, at the same time, calculates the speed from the calculated position signal to output the same as the detected speed value to the speed control circuit. The speed control circuit calculates the duty ratio signal of the PWM pulse for the inverter from an external speed command and the detected speed value so that the speed deviation becomes zero. The inverter circuit, motor, speed detector circuit, inverter control circuit, and the speed control circuit constitute a motor speed control circuit, and speed control of the motor is executed in accordance with the external speed command. The converter control circuit controls the switching device of the chopper circuit in accordance with the signal from the DC voltage control circuit. The DC voltage control circuit detects the DC voltage and the output signal of the speed control circuit, for example, the duty ratio signal, and controls the DC voltage such that the DC voltage rises by a predetermined amount when the duty ratio signal reaches a predetermined value, for example, the upper limit value of a range of the duty ratio signal, and such that the DC voltage falls by a predetermined value when the duty ratio signal reaches a lower limit value. The converter circuit, converter control circuit, and the DC voltage control circuit constitute a DC voltage control circuit of the converter and the DC voltage is controlled thereby.

By combining the motor speed control circuit with the converter DC voltage control circuit and allowing both the circuits to operate respectively, speed control of the motor can be achieved by the use of a simple structure irrespective of the load conditions.

BEST MODE FOR CARRYING OUT THE INVENTION

A detailed description of the invention will be given with reference to the accompanying drawings.

Figure 1:
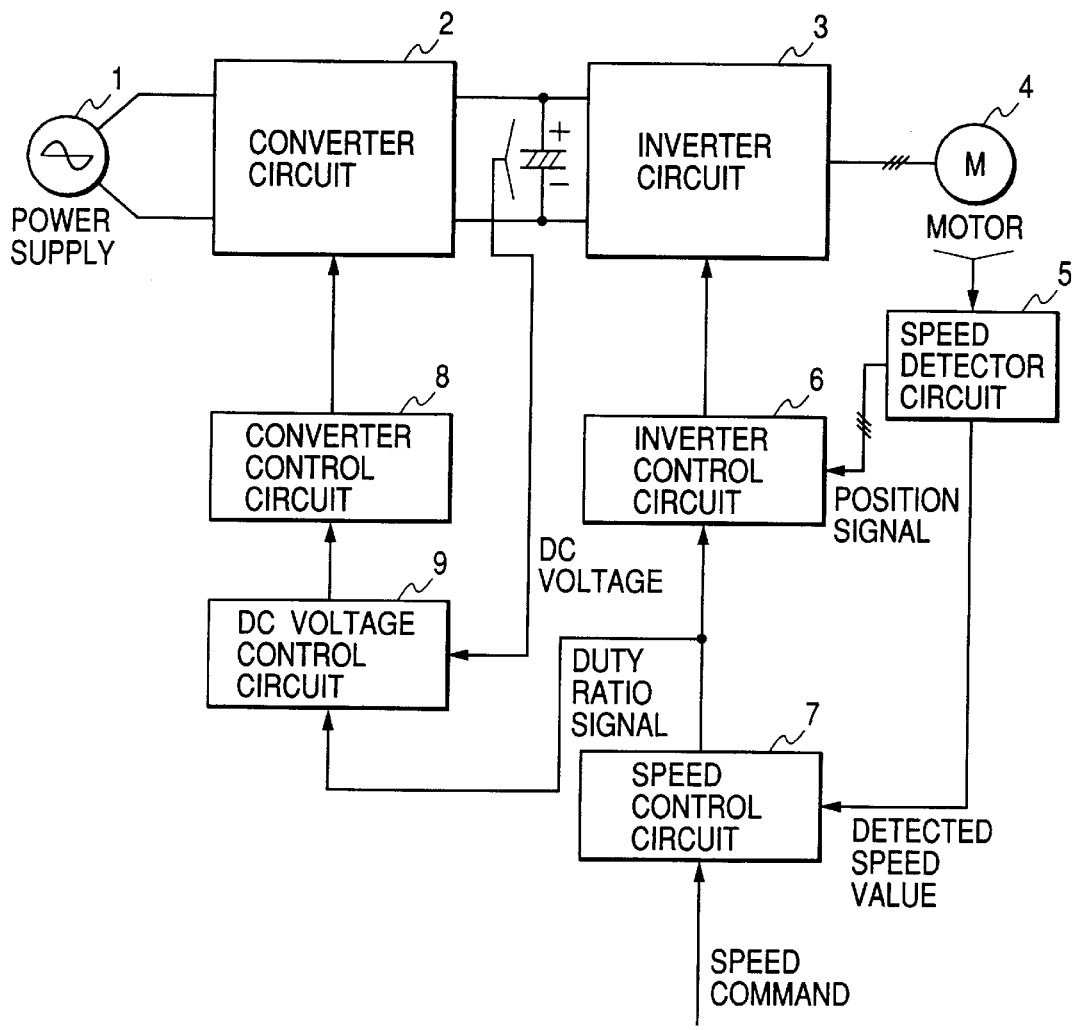
FIG. 1 is a block diagram of a motor controller according to a first embodiment of the invention.
Figure 2:
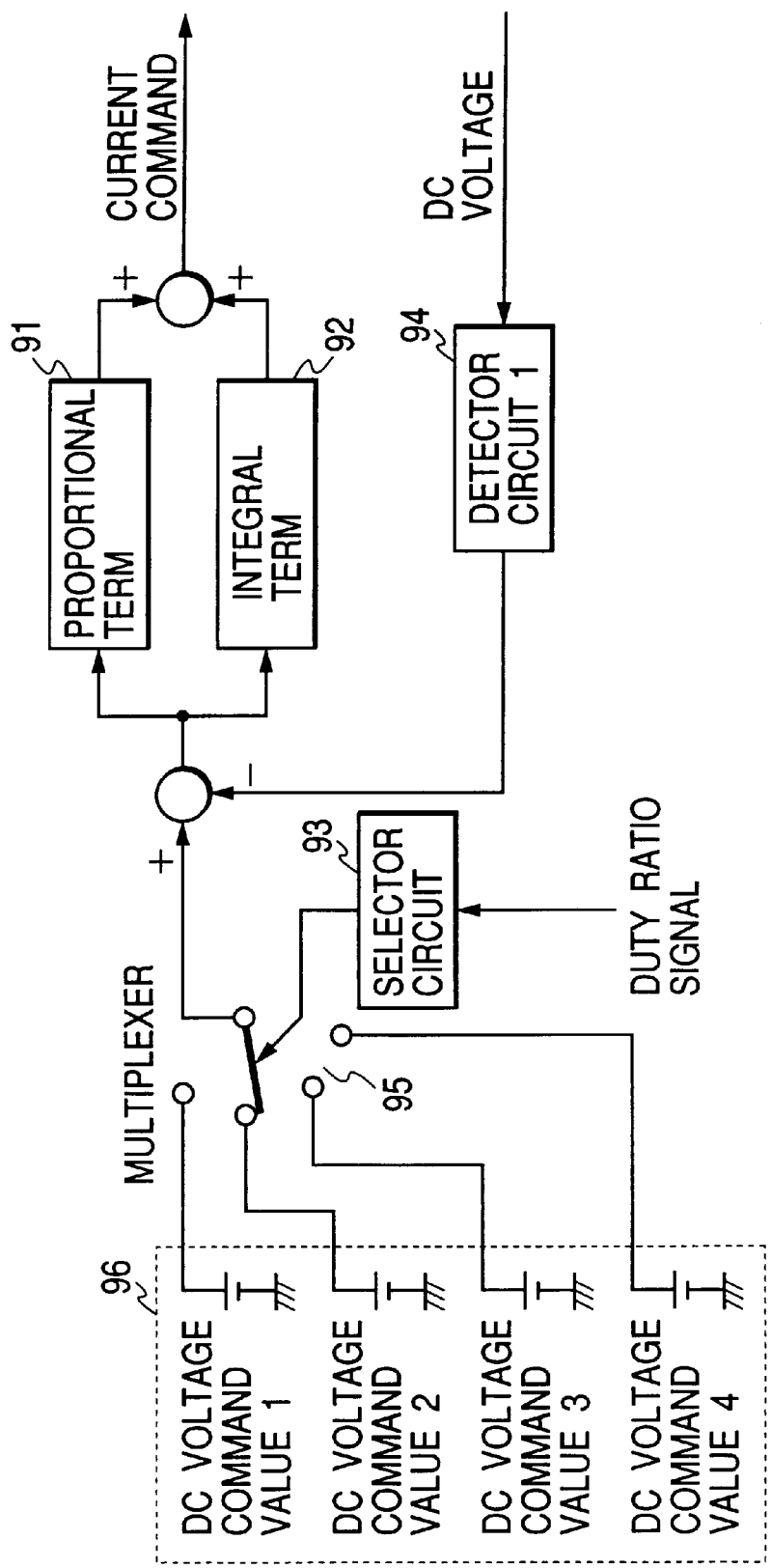
FIG. 2 is a schematic circuit diagram showing the configuration of a DC voltage control circuit, which is a constituent of the motor controller.

FIG. 1 and FIG. 2 are directed to a first embodiment of the motor controller of the invention. FIG. 1 is a general block diagram of the motor controller comprising a converter circuit, which employs a rectifier circuit and a step-up chopper circuit, and a motor driving circuit formed of an inverter circuit and a motor.

Figure 17:
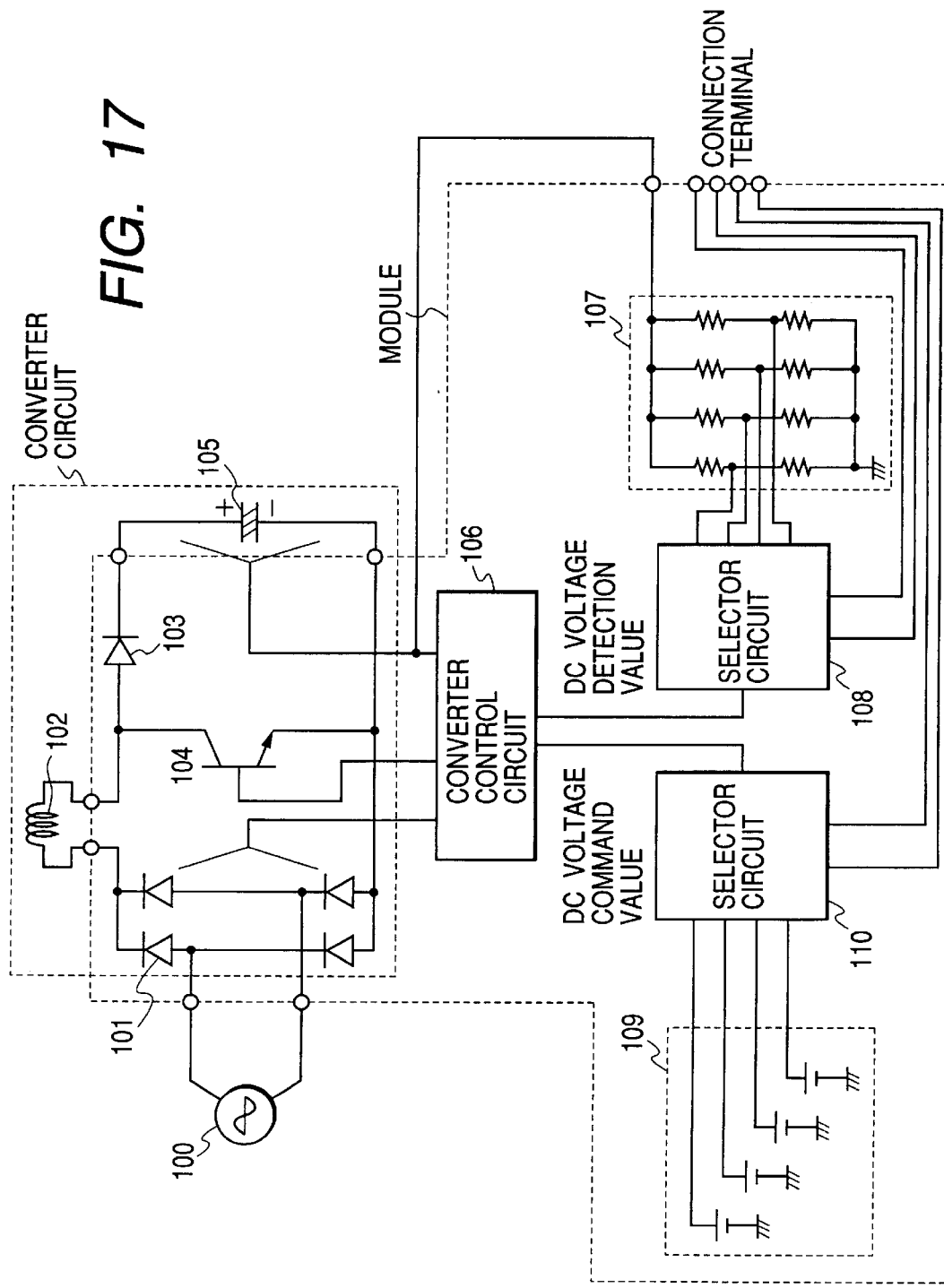
FIG. 17 is a schematic circuit diagram showing the configuration of a converter module wherein a portion of the constituents of the motor controller of the invention are modularized.

An AC power source 1 is connected to a converter circuit 2, which outputs a DC voltage. The converter circuit 2 is made up of a rectifier circuit and a step-up chopper circuit, which is formed of a reactor, a diode and a transistor. The step-up chopper circuit in the converter circuit 2, as seen in FIG. 17, for example, is connected to the output side of the rectifier circuit 101 therein and forces the input current to flow by the switching action of the transistor 104 and energy storing effect of the reactor 102 to thereby step up the voltage. The stepped up DC voltage is supplied to a smoothing capacitor 105 and a stabilized DC voltage is output therefrom.

An inverter 3 for driving a synchronous motor 4 is connected to the smoothing capacitor within the converter circuit 2 and converts the DC voltage supplied from the smoothing capacitor into desired AC voltages to drive the synchronous motor 4.

A speed detector circuit 5 calculates the position of the magnetic pole from the induced voltage produced by the synchronous motor 4 and outputs a position signal to an inverter control circuit 6. It further performs a speed calculation on the basis of the calculated position signal and outputs a detected speed value to a speed control circuit 7.

The speed control circuit 7, on the basis of the detected speed value received from the speed detector circuit 5 and an external speed command, outputs a duty ratio signal to the inverter control circuit 6 so that the speed deviation becomes zero.

The inverter control circuit 6, on the basis of the detected position signal received from the speed detector circuit 5 and the duty ratio signal received from the speed control circuit 7, generates a drive signal to drive a transistor in the inverter 3 to thereby perform speed control of the synchronous motor 4.

A converter control circuit 8 drives the transistor within the converter circuit 2 in accordance with a current command value received from a DC voltage control circuit 9 and controls the input current to the converter circuit 2 to have a sine wave form to thereby improve the power factor of the power source and control the DC voltage at the same time.

The DC voltage control circuit 9 detects the duty ratio signal output by the speed control circuit 7 and controls the DC voltage in accordance with the value of the duty ratio signal.

FIG. 2 shows an example of the internal structure of the DC voltage control circuit 9 according to the present invention. The DC voltage control circuit 9 is formed of a selector circuit 93 and a multiplexer 95 for selecting, in accordance with the duty ratio signal, one of a plurality of DC voltage command values generated by a DC voltage command value generator circuit 96 and for outputting the selected signal, a detector circuit 94 for detecting the output DC voltage from the converter circuit 2 and for converting the same into a voltage value at a level usable in the control circuit 2, a proportional term 91, and an integral term 92.

The proportional term 91 and the integral term 92 operate so that the deviation of the dc voltage detection value from the DC voltage command value may become zero and outputs the result as a current command.

The multiplexer 95 is a circuit which operates to select one of the plurality of provided DC voltage command values in accordance with an external signal and outputs only the selected DC voltage command value. In the example shown in FIG. 2, the DC voltage command values from 1 to 4 are arranged in ascending order of the value. The DC voltage command value 1 is set to the lowest DC voltage that is controllable by the converter circuit 2.

The selector circuit 93, upon receipt of the duty ratio signal from the speed control circuit 7, outputs a switch signal corresponding to the value of the duty ratio signal to the multiplexer 95.

Figure 3:
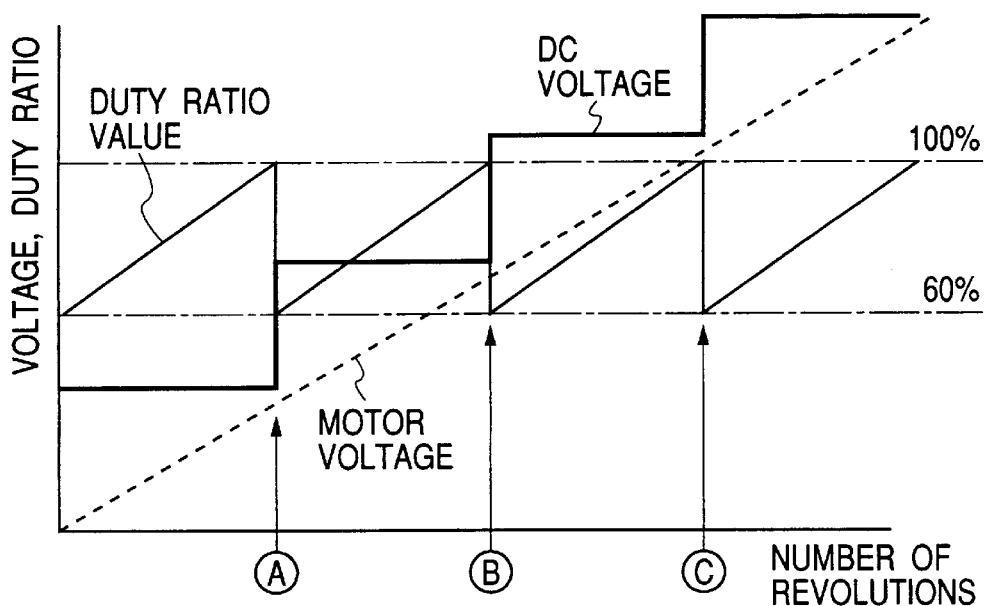
FIG. 3 and FIG. 4 are timing diagrams showing operations of the motor controller according to the first embodiment of the invention.

The operation of the selector circuit 93 will be described with reference to FIG. 3, which is an explanatory drawing of the control operation. FIG. 3 is a graph with the number of revolutions of the motor taken along the abscissa and the DC voltage, the motor voltage and the duty ratio taken along the ordinate. The graph shows variations of the motor voltage, DC voltage and duty ratio with respect to the number of revolutions under a constant load.

At the time when the motor is rotated at a low speed, such as when it is started up, the selector circuit 93 outputs a switch signal to cause the DC voltage command value 1 to be selected and the DC voltage control circuit 9 controls the DC voltage to take on the selected DC voltage command value 1.

Since the voltage is low in this state of the controlled DC voltage, the duty ratio reaches 100% at an early stage of the increase in the rotating speed and, hence, it becomes impossible to increase the number of revolutions of the motor any more (point A). At this point, the selector circuit 93 outputs a switch signal to select the DC voltage command value 2 to the multiplexer 95. The multiplexer 95 selects the DC voltage command value 2 and the DC voltage control circuit operates such that the DC voltage takes on the DC voltage command value 2. Thereby, the duty ratio is suddenly lowered to 60%, while the motor voltage is increased. Although, in the case shown, the minimum value of the duty ratio is set to 60%, this is a value used for convenience of explanation. In reality, depending on the load condition, the number of revolutions of the motor, the response speed of the speed control circuit 7 and the like, the duty ratio does not exhibit a sharp change.

As the number of revolutions of the motor increases, the duty ratio becomes 100% again (point B). Then, the operation as described above is performed again to select the DC voltage command value 3, whereby the DC voltage is increased and the duty ratio again is lowered to 60%.

Through repetition of the above described operations, the DC voltage is increased with the increase in the number of revolutions and, thus, speed control of the motor can be executed.

The case of decreasing the speed of the motor contrary to the above will be described below.

When the number of revolutions of the motor is decreased upon receipt of a speed reducing command, while the motor is rotating at a high speed, the duty ratio is decreased and the motor voltage is lowered. When the duty ratio becomes 60% (point C), the DC voltage-command value is switched from the DC voltage command value 4 to the DC voltage command value 3, contrary to the above, and, thereby, the DC voltage is lowered. When the DC voltage is lowered, the duty ratio is increased to take on a value close to 100%. Here, the decrease in the DC voltage must be set to such a value that will not cause the duty ratio to exceed 100% when the DC voltage is lowered.

To decrease the number of revolutions further, the duty ratio is decreased and the DC voltage command value is switched from the DC voltage command value 3 to the DC voltage command value 2 at the point B. By repeating such operations, the number of revolutions of the motor is controlled.

Through repetition of the above described operations, the duty ratio is kept close to 100% at all times and the motor voltage can also be kept close to the voltage required by the motor at all times. Thus, the conditions of the motor and the inverter can be improved in terms of losses incurred therein and the motor can be driven with a good efficiency and the inverter efficiency kept at a good level at all times. Further, as for the converter, the DC voltage need not be raised more than necessary and, hence, the converter efficiency can be improved.

Further, since the DC voltage can be changed according to the number of revolutions of the motor, one single circuit can support motor rotation from a low speed to a high speed. In other words, even some kinds of motors which have different motor design features can be supported by one controller and operated anytime at an effective operating point.

Figure 4:
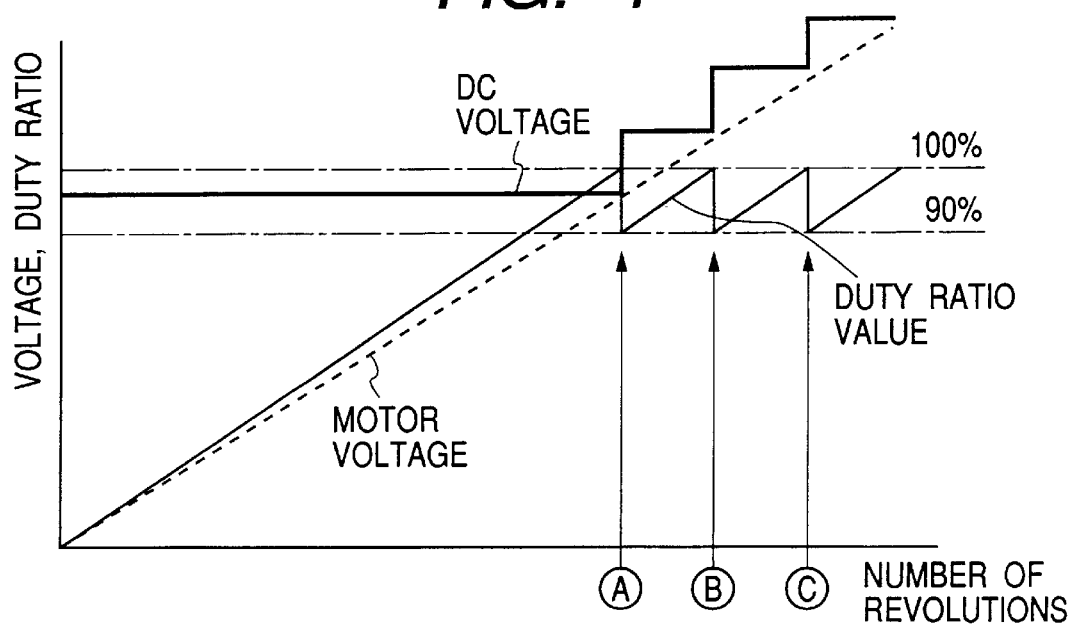

FIG. 4 is an explanatory drawing showing the controlling operations in the case where the switching points of the DC voltage are in the range of higher number revolutions than in the case shown in FIG. 3. Basic operations therein are the same as in the case of FIG. 3. The point different therefrom is that the values of the duty ratio at which the DC voltage is switched are set to 100% and 90%.

Since a step-up chopper circuit is used in the converter circuit 2 and the DC voltage cannot be lowered below $\sqrt{2}$ times the received voltage, the operation shown in FIG. 4 is more effective in practical operations than that shown in FIG. 3. Further, although the converter circuit employing a step-up chopper circuit has been mentioned in the description of the present embodiment, the same operations can be performed even when a converter circuit employing an up/down chopper circuit or the like and which is capable of stepping down the DC voltage is used.

In the foregoing, operations in the case of using four selection levels of the DC voltage command values were described. However, it is possible to set up the DC voltage command values more finely. Further, since the DC voltage can be controlled in a wider range, it is better to increase the number of the selectable DC voltage command values as long as the circuit configuration permits.

Although, in the case of the DC voltage control circuit shown in FIG. 2, the current command value is calculated from the deviation of the DC voltage, the DC voltage command value may be directly calculated.

Figure 5:
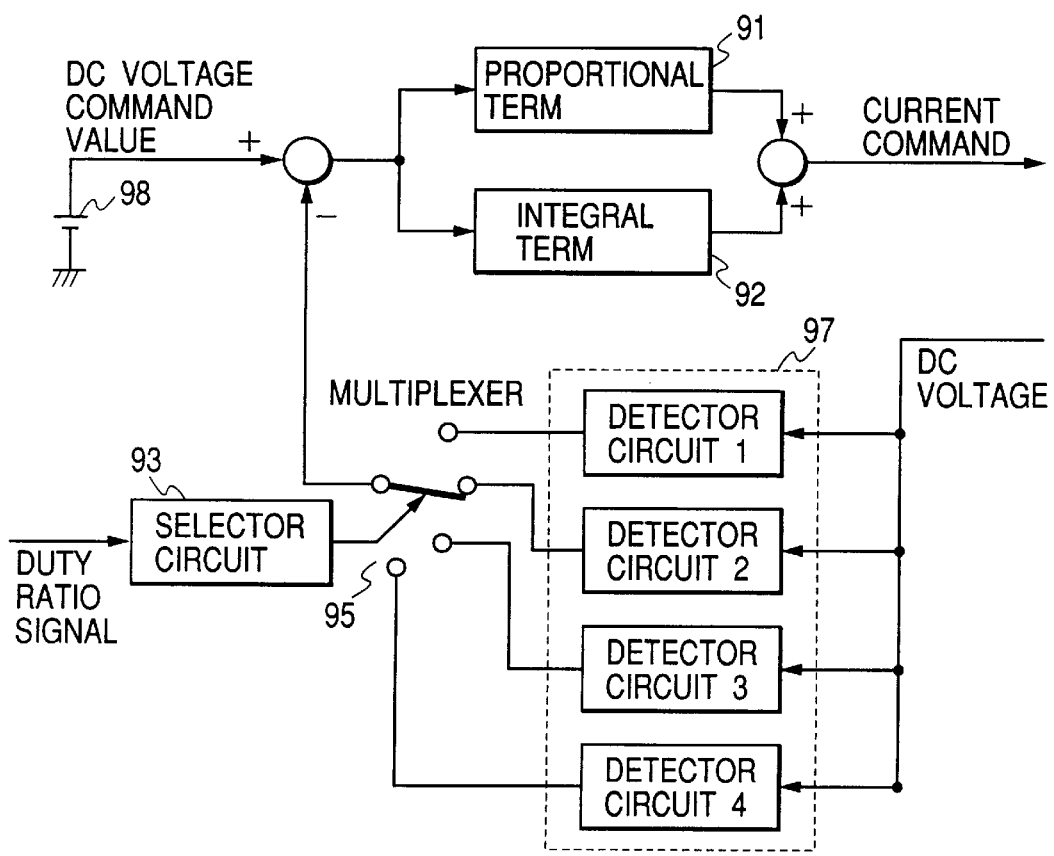
FIG. 5, FIG. 6, FIG. 7, and FIG. 8 are schematic circuit diagrams showing other configurations of a DC voltage control circuit capable of use in the motor controller according to the first embodiment of the invention.

FIG. 5 is a diagram showing the internal structure of another embodiment of a DC voltage control circuit, which is different from the DC voltage control circuit shown in FIG. 2. The points of difference from FIG. 2 lie in a DC voltage command generator circuit 98 and a DC voltage detector circuit 97. In the system shown in FIG. 5, there is only one DC voltage command value and there are provided a plurality of detector circuits 97. The other circuits function in the same manner as those in FIG. 2.

In the case of FIG. 5, the multiplexer 95 is switched by a switch signal generated by the selector circuit 93 in response to receipt of a duty ratio signal and, thereby, one of the plurality of detector circuits is selected. According to the detection signal from the selected detector circuit, the DC voltage is controlled. Also in this system, the operations described with reference to FIG. 3 and FIG. 4 can be performed and the same effects can be obtained. Here, the detector circuit 97 is a circuit for converting the DC voltage into a voltage level which can be treated by the control circuit, and the circuit is configured such that it generates a voltage at the same level as the DC voltage command value when a predetermined DC voltage level is reached.

Recently, many kinds of devices, such as a converter circuit controlling an IC, of the type in which the DC voltage is controlled through adjustment of the gain in the detector circuit have been produced. In motor controllers employing such a converter circuit controlling an IC, the system as shown in FIG. 5 can be used effectively.

Figure 6:
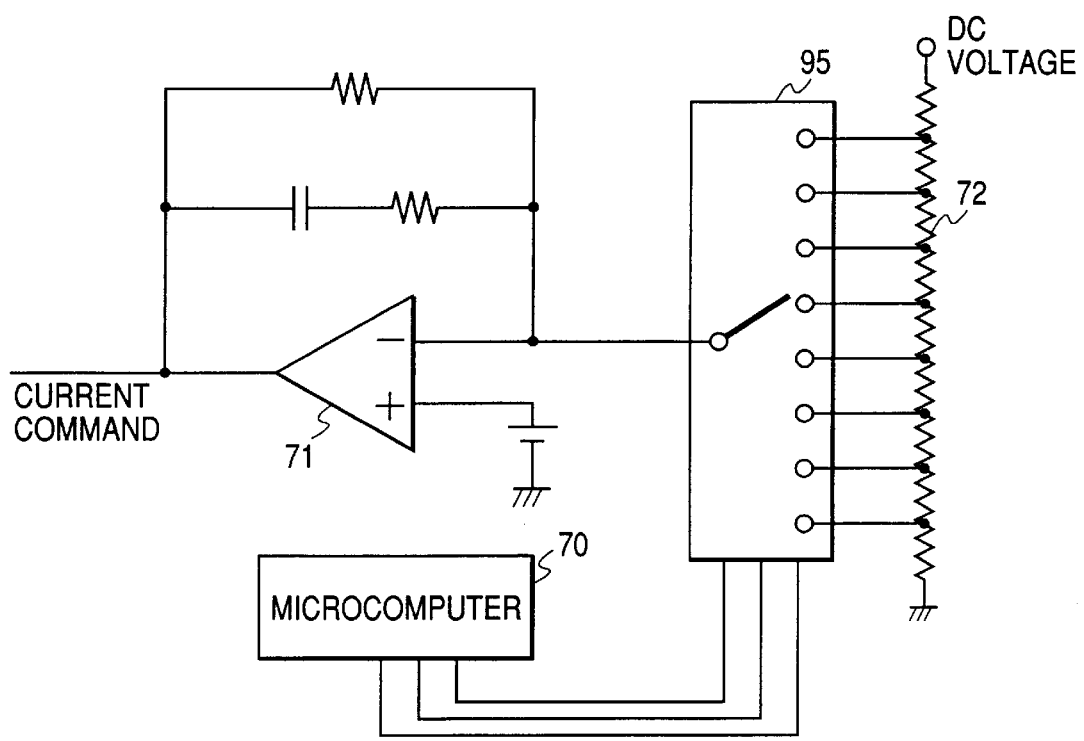

FIG. 6 is a diagram showing a more specific example of the circuit of FIG. 5. In FIG. 6, the selector circuit 93 shown in FIG. 5 is realized through software employing a microcomputer 70. Further, the proportional term 91 and integral term 92 shown in FIG. 5 are realized by an analog circuit employing an operational amplifier 71. The detector circuit 97 for detecting the DC voltage is constructed as a resistor ladder circuit 72, as shown in FIG. 6. Here, the microcomputer 70 also performs the functions of the speed detector circuit 5 and the speed control circuit 7 shown in FIG. 1.

The DC voltage control circuits shown in FIG. 2, FIG. 5 and FIG. 6 are circuits for performing DC voltage control through selection of the DC voltage command value or the DC voltage detection value by means of the multiplexer 95 or the like. In these systems, however, the command value or the detection value is switched over discontinuously. Hence, a great change in the DC voltage is produced at the switching time.

Figure 7:
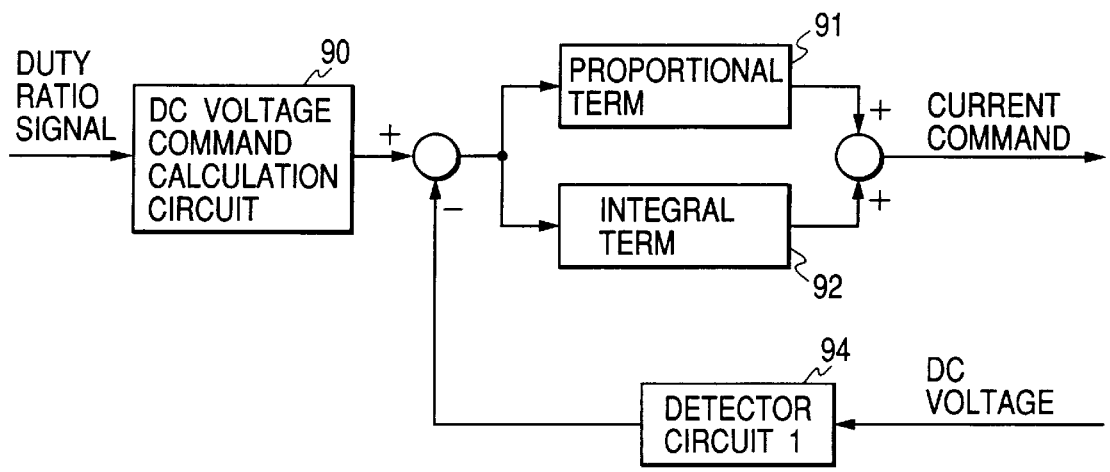

FIG. 7 shows the structure of a DC voltage control circuit employing a DC voltage command calculation circuit 90 which is capable of continuously varying the DC voltage command value 96 shown in FIG. 2. Further, FIG. 8 shows a case where the DC voltage detector circuit 97 shown in FIG. 5 is replaced with a DC voltage detection and calculation circuit 99.

The DC voltage command calculation circuit 90 detects the duty ratio signal and calculates the DC voltage command value causing the duty ratio to take on a predetermined value. On the other hand, the DC voltage detection and calculation circuit 99 detects the duty ratio signal and calculates the DC voltage detection gain causing the duty ratio to take on a predetermined value and, then, outputs the DC voltage detection value in accordance with the detected gain.

Through the described circuit configurations, the DC voltage command value or the DC voltage detection value becomes a continuous output and allows the DC voltage to be controlled linearly.

Figure 8:
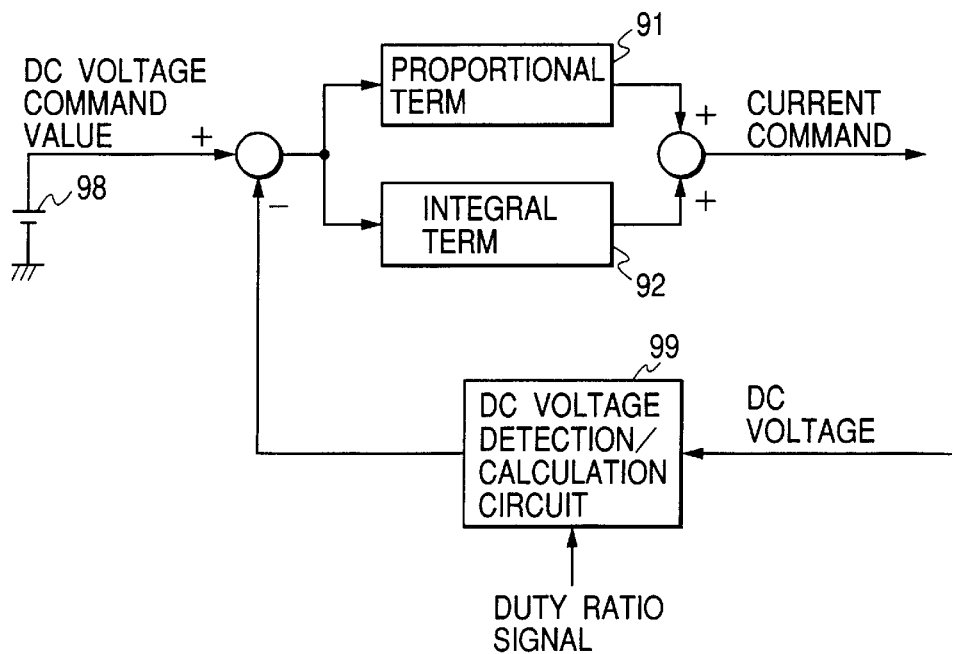
Figure 9:
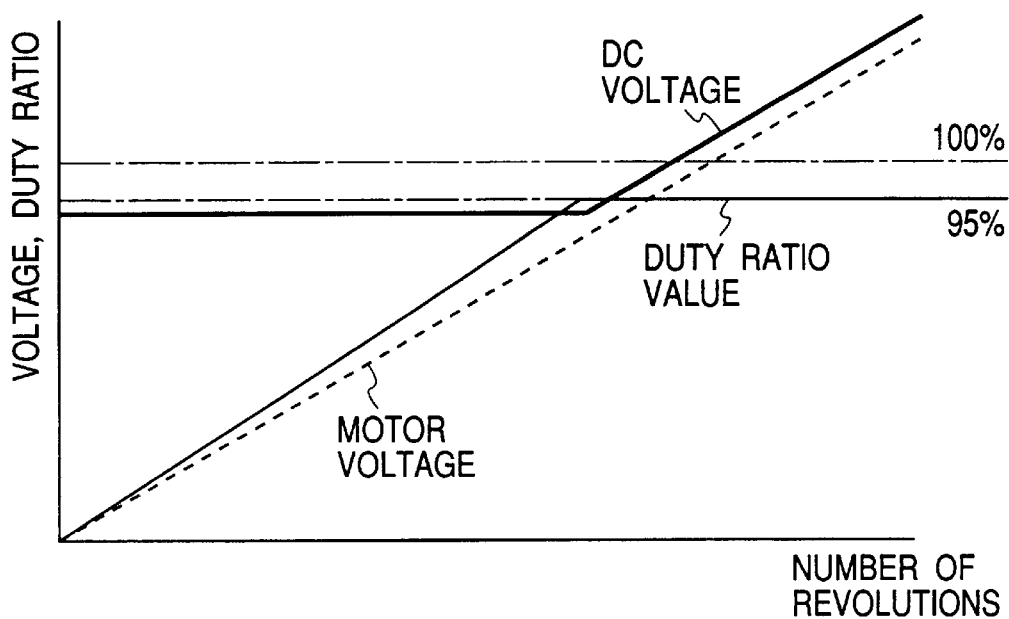
FIG. 9 and FIG. 10 are timing diagrams of the operations of the motor controller according to the first embodiment of the invention for those cases where the DC voltage control circuits shown in FIG. 7 and FIG. 8 are used, respectively.

FIG. 9 shows the DC voltage, duty ratio and the motor voltage with respect to the number of revolutions obtained when the DC voltage control circuit shown in FIG. 7 or FIG. 8 is used. According to this system, the DC voltage can be linearly controlled and, hence, smooth motor control can be executed.

Figure 10:
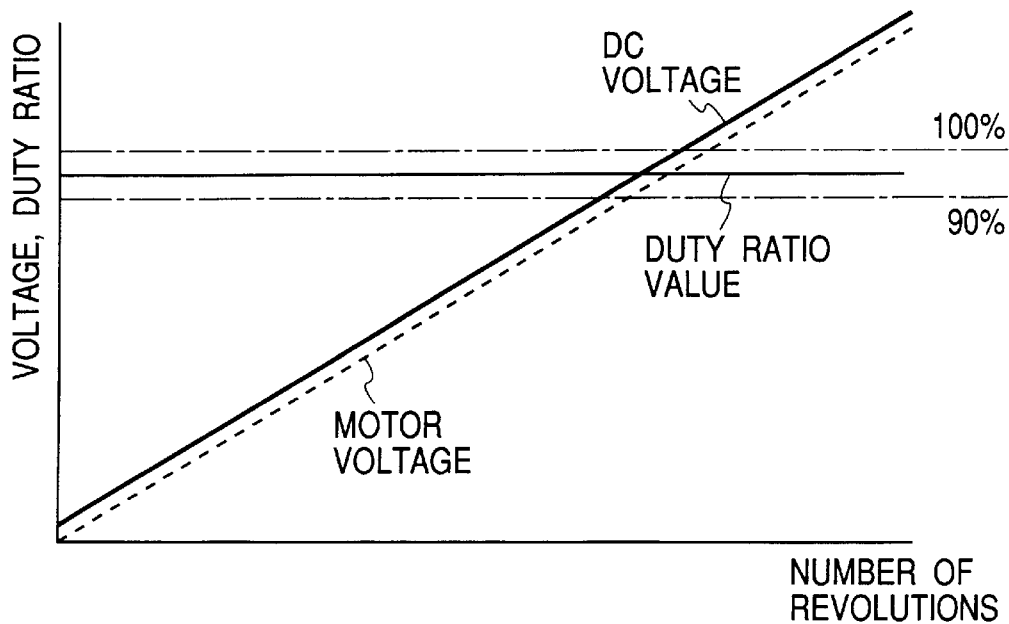

Since the DC voltage can be controlled to become lower than the power source voltage when an up/down chopper circuit is used in the converter circuit 2 shown in FIG. 1, control with a large value of the duty ratio can be executed in the range of low rotating speeds as shown in FIG. 10. Accordingly, it becomes possible to execute effective motor control even when the rotating speed is low. FIG. 10 shows the relationships of the DC voltage, duty ratio and the motor voltage to the number of revolutions when a converter capable of freely controlling the DC voltage is used.

While the number of revolutions was taken along the abscissa in the explanatory drawings of the controlling operations shown in FIG. 3, FIG. 4, FIG. 9, and FIG. 10 above, similar graphs can be obtained even if the motor load or motor output is taken along the abscissa.

Figure 11:
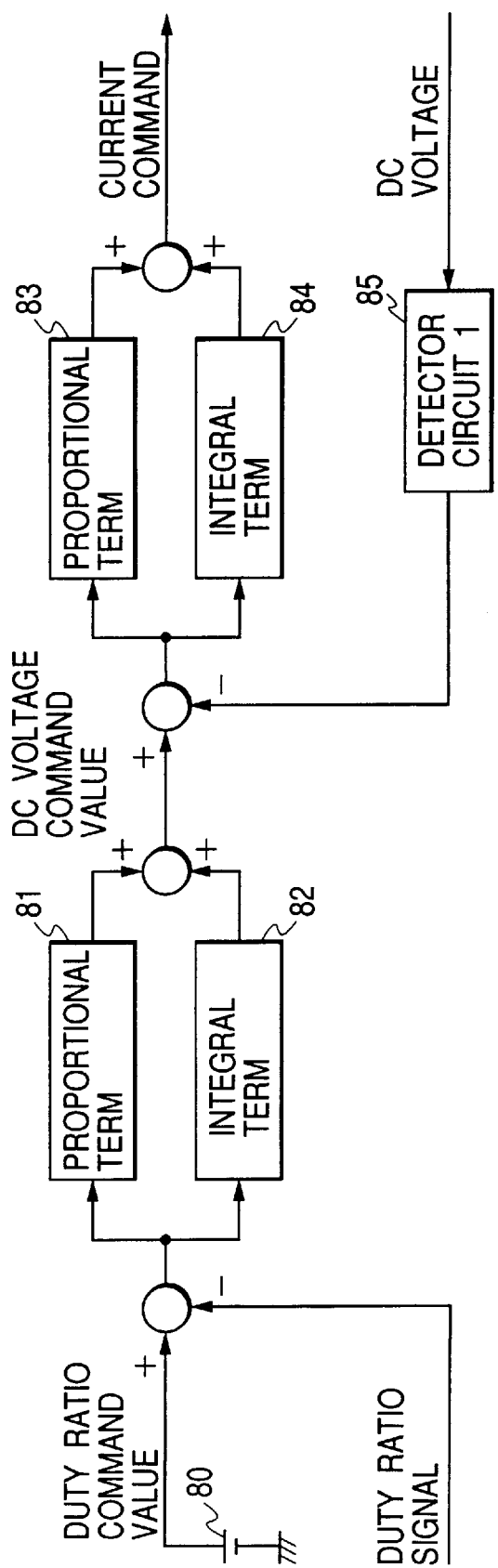
FIG. 11 is a schematic circuit diagram showing another configuration of the DC voltage control circuit forming a constituent of the motor controller according to the first embodiment of the invention.

FIG. 11 shows a configuration of a DC voltage control circuit including a duty ratio control circuit formed of a duty ratio command value generator circuit 80, a proportional term 81, and an integral term 82 for linearly outputting the DC voltage command value similar to the circuit shown in FIG. 7. By using such a duty ratio control circuit, the DC voltage command value for keeping the duty ratio constant can be calculated. Even when the DC voltage control circuit shown in FIG. 11 is used, operations like those shown in FIG. 9 and FIG. 10 can be performed.

Figure 12:
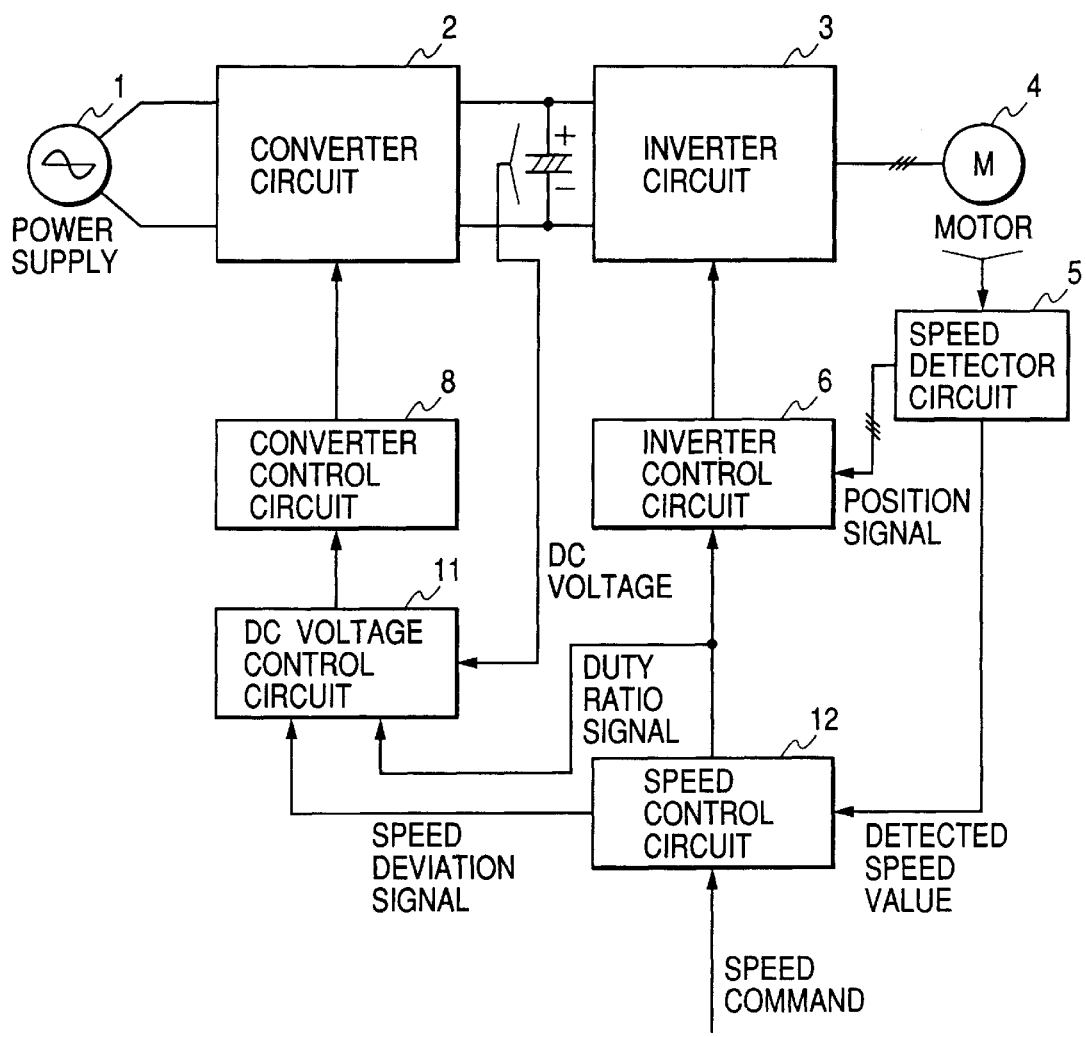
FIG. 12 is a block diagram of a motor controller according to a second embodiment of the invention.
Figure 13:
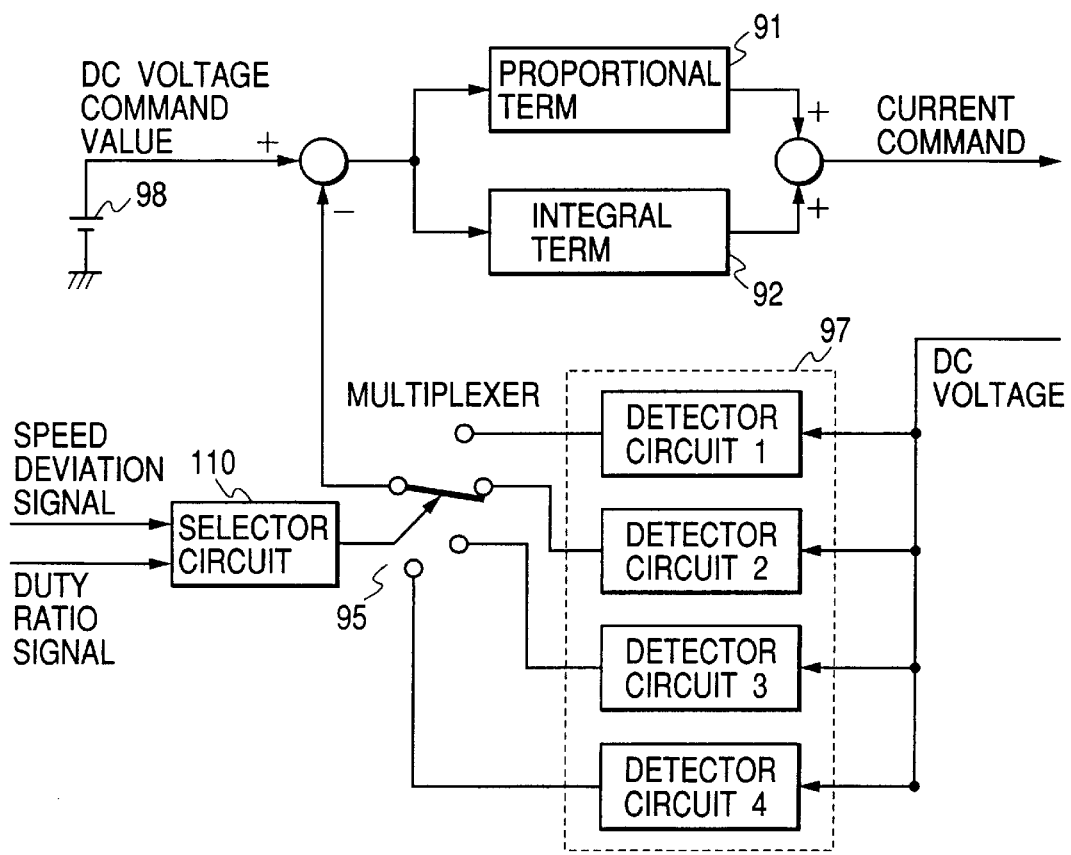
FIG. 13 is a schematic circuit diagram showing the configuration of a DC voltage control circuit forming a constituent of the motor controller.

The configuration of a motor controller according to another embodiment of the invention will be described with reference to FIG. 12 and FIG. 13. FIG. 12 is an overall block diagram of the motor controller, and FIG. 13 is a block diagram of the DC voltage control circuit 11 shown in FIG. 12. The different point of the present embodiment from the embodiment shown in FIG. 1 lies in the DC voltage control circuit 11, namely, in the fact that the duty ratio signal and a speed deviation signal within the speed control circuit 12 shown in FIG. 12 are used for selection in the DC voltage detector circuit 97.

Operations of the selector circuit 110 shown in FIG. 13 will be described with reference to FIG. 3. The selector circuit 110, when the duty ratio has reached 100% and the speed deviation is tending to increase the duty ratio still further, switches the output of the DC voltage detector circuit 97 to increase the DC voltage. Conversely, when the duty ratio has lowered to 60% and the speed deviation is tending to decrease the duty ratio still further, it switches the output of the DC voltage detector circuit 97 to decrease the DC voltage. Thereby, the motor controller of the present embodiment operates as shown in FIG. 3.

When the motor controller shown in FIG. 1 is used, since the selector circuit 93 takes only the duty ratio signal as the criterion for its selection, it would switch the DC voltage even when the motor load and motor output are balanced at the duty ratio of 100% or 60%.

The present embodiment is improved in view of the above described point. Namely, rather than detecting the duty ratio signal, it detects a signal to determine whether the motor load and the motor output are balanced, a speed deviation signal in the present case, so as to prevent useless switching over of the DC voltage value. Although the speed deviation signal is detected in the present embodiment, another signal may be used provided that it indicates a balanced state between the motor load and the motor output.

While, in this embodiment, the DC voltage detector circuit 97 is adapted to select one of the DC voltages, it may be adapted to provide a plurality of DC voltage command values and to select one DC voltage command value therefrom.

Figure 14:
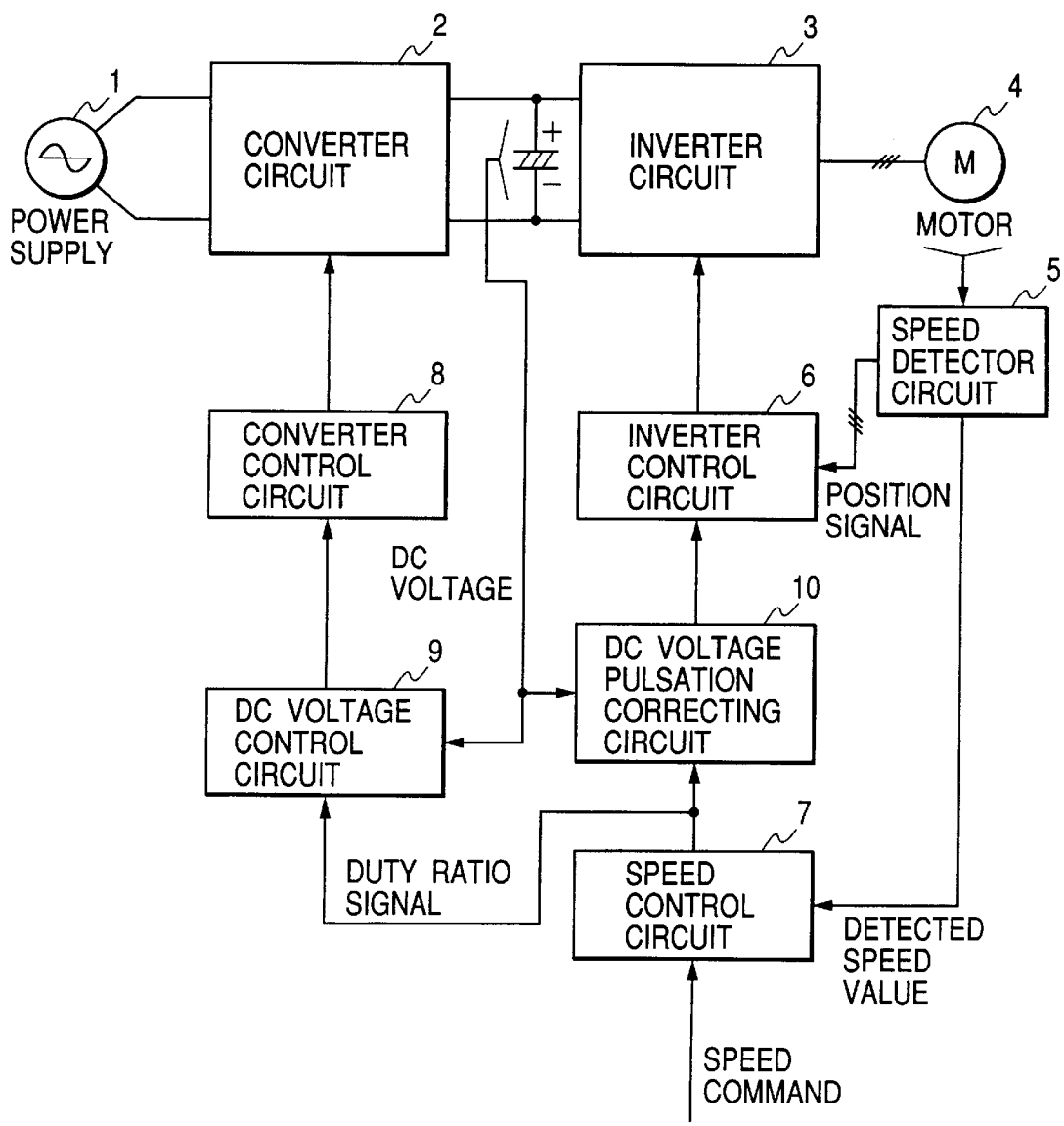
FIG. 14 is a block diagram of a motor controller according to a third embodiment of the invention.
Figure 15:
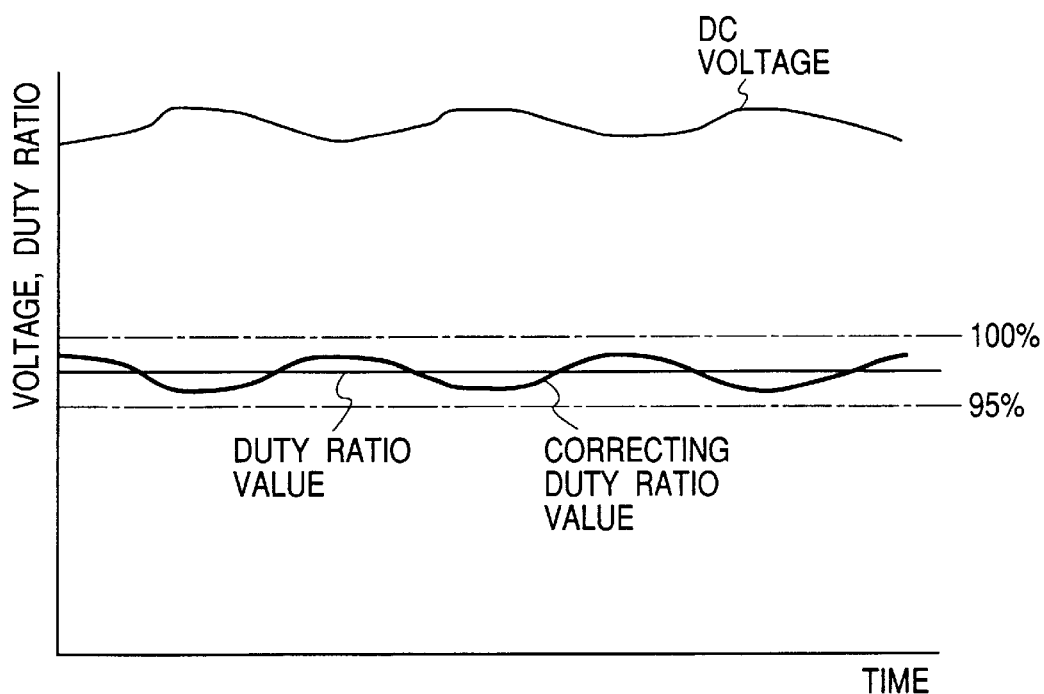
FIG. 15 is an operational diagram showing the correcting of a pulsation of the DC voltage as performed in the motor controller.

A motor controller according to still another embodiment of the invention will be described with reference to FIG. 14 and FIG. 15. FIG. 14 shows a DC voltage pulsation correcting motor controller which is formed of the motor controller shown in FIG. 1 with a DC voltage pulsation correcting circuit 10 added thereto. FIG. 15 is a drawing explanatory of the operation of the DC voltage pulsation correcting motor controller of FIG. 14.

Each circuit of the DC voltage pulsation correcting motor controller shown in FIG. 14 operates in the same manner as in the first embodiment shown in FIG. 1, except for the DC voltage pulsation correcting circuit 10. The DC voltage pulsation correcting circuit 10 detects pulsating components in the DC voltage and multiplies the duty ratio signal generated in the speed control circuit 7 by a pulsating signal of opposite phase to the detected pulsating components to thereby generate a correcting duty ratio signal.

FIG. 15 shows changes with time in the duty ratio when the DC voltage pulsation correction was made. In FIG. 15, the abscissa represents the time and the ordinate represents the DC voltage, the duty ratio, and the correcting duty ratio. It is known that the correcting duty ratio varies in the opposite phase to the pulsating components of the DC voltage.

According to this embodiment, even if there exist pulsating components in the DC voltage, motor control not affected thereby can be executed. In this system, however, the DC voltage control circuit 9 must be controlled with the duty ratio kept below 100%.

Figure 16:
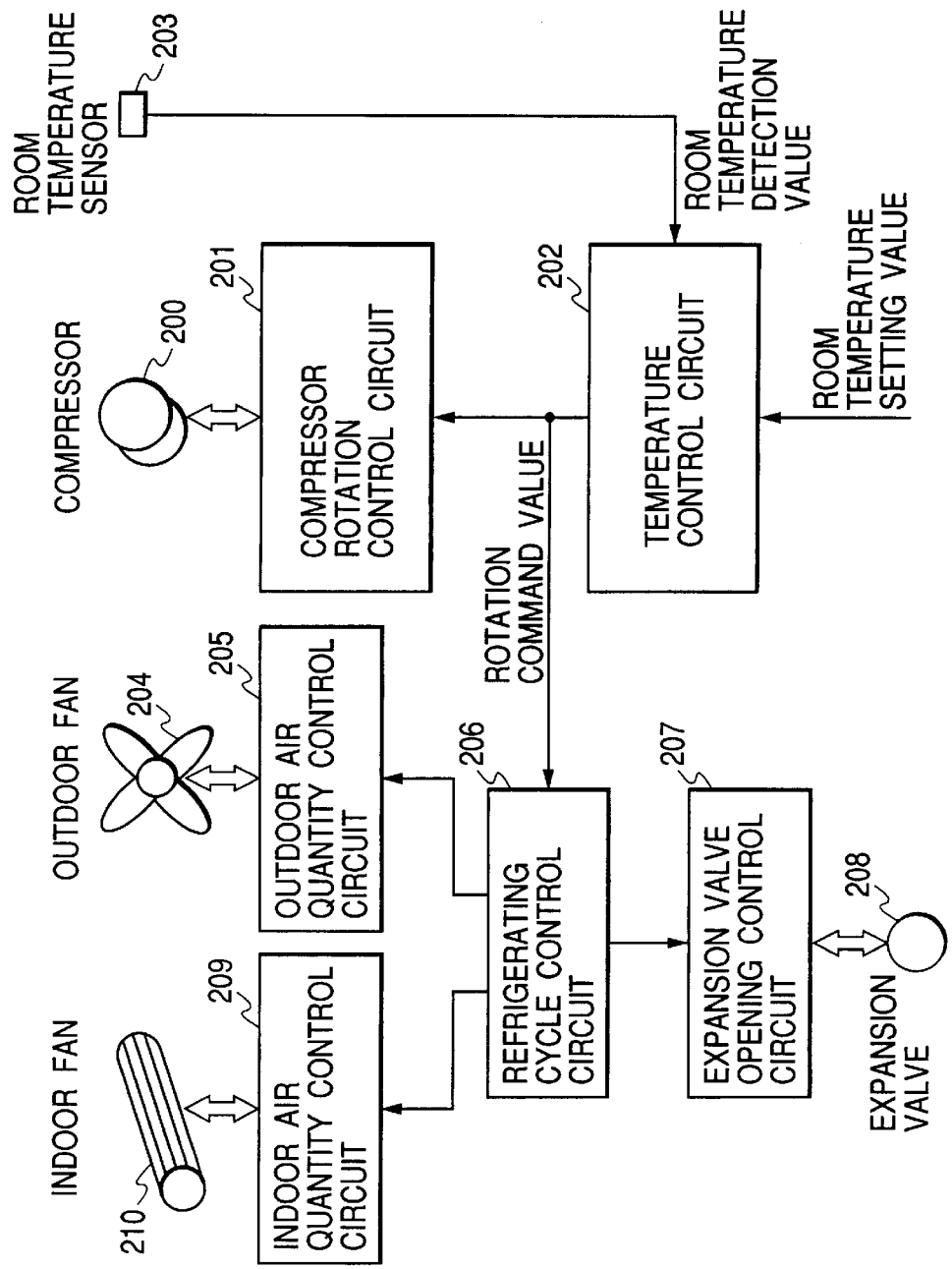
FIG. 16 is a block diagram of an air conditioner to which the motor controller of the invention is applied.

The configuration of an air conditioner controller, to which the motor controller of the present invention is applied, is shown in FIG. 16. This embodiment relates an inverter air conditioner for detecting the room temperature and for controlling the room temperature to maintain a set temperature.

The air conditioner controller comprises a room temperature sensor 203 for detecting the room temperature, a temperature control circuit 202 for calculating a rotation command value for a compressor 200 to bring the temperature deviation between the room temperature detection value and the room temperature setting value to zero, a compressor rotation control circuit 201 responsive to the rotation command received from the temperature controller 202 for controlling the number of revolutions of the compressor 200, a refrigerating cycle control circuit 206 for detecting the rotation command value and for calculating and outputting control signals for controlling an outdoor fan 204, an indoor fan 210, and an expansion valve 208 constituting the refrigerating cycle, and control circuits (an outdoor air quantity control circuit 205, an indoor air quantity control circuit 209, and an expansion valve opening control circuit 207) responsive to a control signal from the refrigerating cycle controller 206 for controlling each of the constituents of the refrigerating cycle (the outdoor fan 204, the indoor fan 210, and the expansion valve 208).

The compressor rotation control circuit 201 is a motor controller responsive to the rotation command value from the temperature control circuit 202 for controlling the speed of the motor directly coupled with the compressor, to which the motor controller of the above described embodiment is applied.

The outdoor air quantity control circuit 205 and the indoor air quantity control circuit 209 are also constituted, like the compressor rotation control circuit 201, of motor controllers for controlling the speeds of the motors directly coupled with the outdoor fan and the indoor fan. Signals output from the refrigerating cycle control circuit 206 are rotation command signals for the indoor fan and the outdoor fan.

The expansion valve opening control circuit 207 is directly coupled with the expansion valve 208 and operates as a controller of a step motor for regulating the opening of the expansion valve by generating a step signal in accordance with an opening signal output from the refrigerating cycle control circuit 206 to thereby drive the step motor. The expansion valve 208 is a motor-driven expansion valve whose expansion valve opening is changed in proportion to the angle of rotation of the step motor.

The refrigerating cycle controller 206 calculates control signals for controlling the constituents of the refrigerating cycle (the outdoor fan 204, the indoor fan 210, and the expansion valve 208) such that the number-of-revolutions command value as the output of the temperature controller 202 becomes a preset value and outputs the number-of-revolutions commands and the opening command to the respective controllers. The control signals for the constituents of the refrigerating cycle are calculated such that the refrigerating cycle as a whole operates at the highest efficiency.

The value of the number-of-revolutions command to be previously set in the refrigerating cycle control circuit 206 is changed according to operating conditions of the inverter air conditioner.

By using the air conditioner controller of the present invention, rotations of the compressor at excessively high speeds can be prevented and the service life of the compressor can be prolonged. Further, since the refrigerating cycle as a whole can be operated at the highest efficiency, the cooling and heating capacity is improved and electric charges required for the operation can be saved.

The configuration of a converter module according to an embodiment of the present invention is shown in FIG. 17. This converter module is obtained by having a rectifier circuit, the converter circuit 2, the converter control circuit 8, and the DC voltage control circuit 9 described in the first embodiment integrally incorporated in a single module. In this module, a step-up chopper is used.

The converter circuit is formed of a rectifier circuit 101, a reactor 102, a transistor 104, a diode 103, and a smoothing capacitor 105, of which the semiconductor devices of the rectifier circuit 101, transistor 104, and the diode 105 are modularized.

The converter control circuit 106 has the same function as the converter control circuit 8 shown in FIG. 2. The selector circuit 108 selects one of the DC voltage values of the DC voltage detector circuit 107 in accordance with an external signal. Further, the selector circuit 110 selects one of the DC voltage command values of the DC voltage command circuit 109 in accordance with an external signal.

By the present embodiment, a converter device capable of controlling DC voltage can be easily fabricated in a compact form.

According to the motor controller of the present invention, as described in the foregoing, it is possible to decrease losses incurred in the motor, inverter, and converter by the use of simple structures and to effectively run the controller. Further, since the DC voltage can be varied in accordance with the number of revolutions of the motor, one controller can support an operation ranging from a low speed operation to a high speed operation. In other words, even several types of motors of different motor design can be controlled by one controller and operated so as to provide high efficiency at all times. Further, correction for the pulsation in the DC voltage can be easily carried out and stabilized motor speed control can be achieved.

When the present motor controller is applied to an inverter air conditioner, highly efficient refrigerating cycle control can be performed and the cost of electricity can be reduced.

Still further, by modularizing the converter circuit in the motor controller of the invention, a compact motor controller can be easily fabricated.

We claim:

1. An electric device comprising:
   a motor;
   a compressor driven by said motor; and
   a control device that controls said motor in accordance with a state of a load of said motor;
   wherein said control device changes a first DC voltage for said motor into a second DC voltage for said motor when a number of revolutions of said motor becomes a predetermined state in accordance with the state of the load of said motor.

2. An electric device according to claim 1, wherein said electric device is an inverter air conditioner.

3. An electric device according to claim 1, wherein said control device includes an inverter which is always pulse width modulation controlled.

4. An electric device comprising:
   a motor;
   a compressor driven by said motor; and
   a control device that controls said motor in accordance with a state of a load of said motor;
   wherein said control device changes a first DC voltage for said motor into a second DC voltage for said motor when a duty ratio of said motor becomes a predetermined state in accordance with the state of the load of said motor.

5. An electric device according to claim 4, wherein said electric device is an inverter air conditioner.

6. An electric device according to claim 4, wherein said control device includes an inverter which is always pulse width modulation controlled.

7. A motor controller comprising:
a converter circuit including a rectifier circuit for converting AC power to a DC voltage, a smoothing circuit, and a chopper circuit for controlling said DC voltage by utilizing a switching operation and the energy storing effect of an inductance;
a motor drive device including an inverter circuit connected to the output of said converter circuit for controlling a motor;
a converter control circuit for controlling the switching operation of said chopper circuit;
an inverter control circuit for controlling the switching operation of said inverter circuit for driving said motor;
a speed detector circuit for detecting a position of the rotor of said motor for calculating the speed value of said motor;
a speed control circuit responsive to said calculated speed value and a speed command value for performing speed control of said motor through said inverter control circuit; and
a DC voltage control circuit responsive to the output signal of said speed control circuit for controlling said DC voltage through said converter control circuit;
wherein said DC voltage control circuit, when the output of said speed control circuit reaches a predetermined value, outputs a signal to said converter control circuit to cause said DC voltage to increase in accordance with a state of a load of said motor.

8. A motor controller according to claim 7, wherein said inverter circuit is always controlled by pulse width modulation control.

9. Motor controller comprising:
a converter circuit including a rectifier circuit for converting AC power to a DC voltage, a smoothing circuit, and a chopper circuit for controlling said DC voltage by utilizing a switching operation and the energy storing effect of an inductance;
a motor drive device including an inverter circuit connected to the output of said converter circuit for controlling a motor;
a converter control circuit for controlling the switching operation of said chopper circuit;
an inverter control circuit for controlling the switching operation of said inverter circuit for driving said motor;
a speed detector circuit for detecting a position of the rotor of said motor for calculating the speed value of said motor;
a speed control circuit responsive to said calculated speed value and a speed command value for performing speed control of said motor through said inverter control circuit;
a DC voltage control circuit responsive to the output signal of said speed control circuit for controlling said DC voltage through said converter control circuit; and
a DC voltage pulsation correcting circuit for detecting pulsating components of said DC voltage for changing the input signal to said inverter control circuit in accordance with the pulsating components.

10. A motor controller comprising:
a converter circuit including a rectifier circuit for converting AC power to a DC voltage, a smoothing circuit, and a chopper circuit for controlling said DC voltage by utilizing a switching operation and the energy storing effect of an inductance;
a motor drive device including an inverter circuit connected to the output of said converter circuit for controlling a motor;
a converter control circuit for controlling the switching operation of said chopper circuit;
an inverter control circuit for controlling the switching operation of said inverter circuit for driving said motor;
a speed detector circuit for detecting a position of the rotor of said motor for calculating the speed value of said motor;
a speed control circuit responsive to said calculated speed value and a speed command value for supplying said inverter control circuit with a duty ratio signal to cause the speed deviation to approach zero; and
a DC voltage control circuit connected to receive said duty ratio signal, and including a DC voltage command value generator circuit for generating a DC voltage command value and a DC voltage detector circuit for detecting a DC voltage corresponding to the output of said converter circuit, a selector circuit for selecting the DC voltage command value or the DC voltage detection value so that said duty ratio signal takes on a value within a predetermined range, and a circuit for generating a current command value to cause the deviation of the DC voltage detection value from the DC voltage command value to approach zero and for outputting the current command value to said converter circuit.

11. A motor controller according to claim 10, wherein said speed control circuit further outputs a signal representing said speed deviation and inputs the same to said DC voltage control circuit.

12. A motor controller according to claim 10, wherein said DC voltage control circuit, when said duty ratio signal reaches the upper limit value or the lower limit value of said predetermined range, generates a current command value for increasing or decreasing said DC voltage.

13. A motor controller according to claim 10, further comprising a DC voltage pulsation correcting circuit for detecting pulsating components of said DC voltage, for generating a correcting duty ratio signal by multiplying said duty ratio signal by a pulsating signal in opposite phase to said pulsating components, and for inputting the same to said inverter control circuit.

14. An inverter air conditioner having:
a rectifier circuit for converting AC power to a DC voltage and a smoothing circuit;
a power factor improving circuit including a step-up chopper circuit for controlling said DC voltage and controlling the power factor of the power supply to effect improvement thereof by utilizing a switching operation and the energy storing effect of an inductance;
a motor drive device including an inverter circuit connected to the output of said power factor improving circuit for controlling a motor;
a chopper control circuit for controlling the switching operation of said step-up chopper circuit;

an inverter control circuit for controlling the switching operation of said inverter circuit for driving the motor; and a speed control circuit for controlling the speed of said motor by using said inverter control circuit in accordance with a speed command value coming from a temperature control circuit of said air conditioner, said inverter air conditioner comprising a DC voltage control circuit detecting the output signal of said speed control circuit for causing the DC voltage to rise when said output signal reaches a predetermined upper limit value and causing the DC voltage to fall when the output signal reaches a predetermined lower limit value.

15. An inverter air conditioner according to claim 14, wherein the output signal of said speed control circuit is a duty ratio signal.

* * * * *